(12) United States Patent
Bhatia

(10) Patent No.: US 6,215,657 B1
(45) Date of Patent: Apr. 10, 2001

(54) KEYBOARD HAVING AN INTEGRAL HEAT PIPE

(75) Inventor: Rakesh Bhatia, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/854,185

(22) Filed: May 9, 1997

(51) Int. Cl.⁷ .................. G06F 1/20; H05K 7/20
(52) U.S. Cl. .............. 361/687; 361/680; 165/104.33
(58) Field of Search .............. 364/708.1; 361/687, 361/680, 699, 700, 704–707, 711, 717–719; 174/16.3, 15.2; 165/86, 104.33

(56) References Cited

U.S. PATENT DOCUMENTS

| | | | |
|---|---|---|---|
| 3,613,778 | 10/1971 | Feldman, Jr. et al. | 165/104.26 |
| 3,680,189 | 8/1972 | Noren | 165/104.26 |
| 3,803,688 | * 4/1974 | Peck . | |
| 5,283,715 | * 2/1994 | Carlsten et al. | 361/702 |
| 5,313,362 | * 5/1994 | Hatada et al. | 361/687 |
| 5,409,055 | * 4/1995 | Tanaka et al. | 165/104.33 |
| 5,513,070 | 4/1996 | Xie et al. | 361/700 |
| 5,526,289 | 6/1996 | Dinh et al. | 361/687 |
| 5,557,500 | 9/1996 | Baucom et al. | 361/687 |
| 5,568,360 | 10/1996 | Penniman et al. | 361/687 |
| 5,581,443 | 12/1996 | Nakamura et al. | 361/705 |
| 5,588,483 | * 12/1996 | Ishida | 165/86 |
| 5,598,320 | 1/1997 | Toedtman et al. | 361/687 |
| 5,621,613 | * 4/1997 | Haley et al. | 361/687 |
| 5,642,776 | * 7/1997 | Meyer, IV et al. | 165/104.26 |
| 5,646,822 | 7/1997 | Bhatia et al. | 165/104.33 |
| 5,661,637 | * 8/1997 | Villaume | 361/687 |
| 5,694,294 | 12/1997 | Ohashi et al. | 361/687 |
| 5,718,282 | 2/1998 | Bhatia et al. | 165/104.33 |
| 5,764,482 | 6/1998 | Meyer, IV et al. | 361/699 |
| 5,831,333 | 11/1998 | Malladi et al. | 361/719 |
| 5,880,929 | * 3/1999 | Bhatia | 361/687 |

FOREIGN PATENT DOCUMENTS 307395   10/1995   (CH) .............. G06F/3/023
0 702 287  *  3/1996   (EP) .

* cited by examiner

Primary Examiner—Lynn D. Feild
(74) Attorney, Agent, or Firm—Blakely, Sokoloff, Taylor & Zafman LLP

(57) ABSTRACT

A computer keyboard having an integral heat pipe.

29 Claims, 7 Drawing Sheets

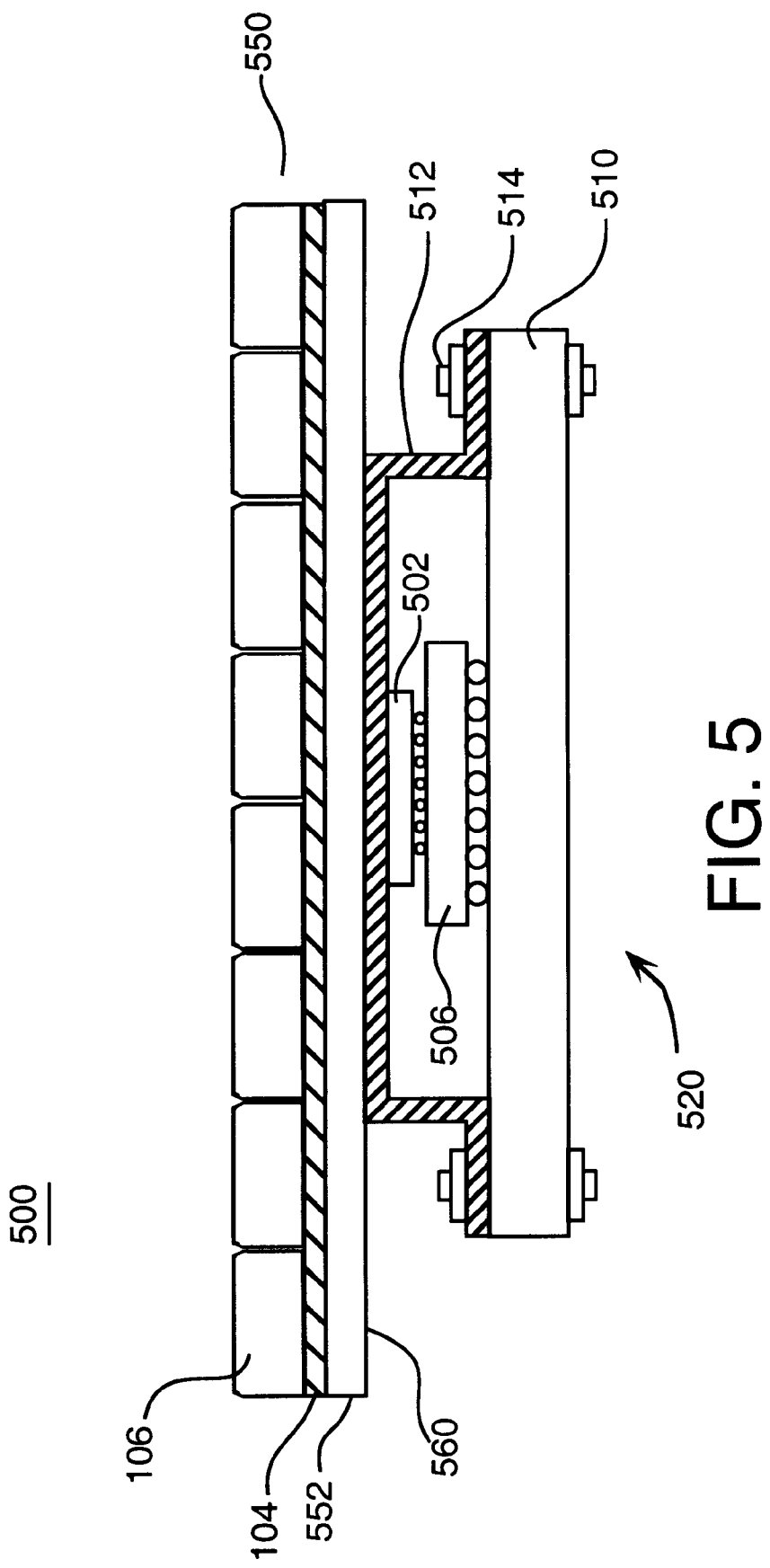

KEYBOARD HAVING AN INTEGRAL HEAT PIPE

FIELD OF THE INVENTION

The present invention relates to an apparatus for cooling heat dissipating components within electronic and computer system enclosures. More particularly, the invention relates to a computer keyboard having an integral heat pipe.

BACKGROUND OF THE INVENTION

Integrated circuits (ICs) are typically housed within a plastic or ceramic package. The packages have leads or surface pads that are soldered to a printed circuit board. The circuit board and package are often located within an enclosed computer chassis that contains other circuitry associated with the computer system such as peripherals, memory cards, video cards, power supplies, etc.

It is desirable to have a high rate of heat transfer from the IC package in order to maintain the temperatures of the IC within safe operating limits. Modern microprocessors typically employ millions of transistors in internal circuitry that require some type of cooling mechanism, otherwise, excessive temperatures may affect the performance of the circuit and cause permanent degradation of the device. Hence, as the performance of integrated circuits continue to expand, the need to provide more efficient, reliable and cost effective heat removal methods has become increasingly important in the design of computer system enclosures and particularly in small general purpose computer systems, such as laptop and notebook computers.

A number of prior art methods have been used to remove heat from heat generating components located within the confines of a computer system enclosure. For example, the method of cooling integrated circuit devices within notebook computers has evolved from the simple attachment of a finned heat sink to the top surface of the device, to the development of finned heat sinks having integral fans. More recent developments have included the use of large, flat heat spreading plates. In such applications, the integrated circuit (generally, the CPU) is directly or indirectly attached to a metal plate having a large thermal mass and a large heat transfer surface area. In some instances, the integrated circuit device is thermally coupled to the heat spreading plate by a heat pipe or other low resistance thermal path.

Some prior art heat removal systems utilize the computer keyboard as the system heatsink structure. As shown in FIG. 1, a typical computer keyboard 100 includes a support plate 102 onto which is mounted a printed circuit board 104 and a plurality of keys 106 upon which a user may strike to input data into the computer. Generally, the keyboard support plate 102 is configured as one of the largest metallic members within a portable computer and is therefore chosen as a heatsink in some heat removal system designs.

FIG. 2 illustrates a prior art heat removal system 200 located within a portable computer. Heat removal system 200 includes a circular heat pipe 110 that transfers heat away from an integrated circuit device 120 to a heat spreading plate 116 that is attached to the keyboard support plate 102. Device 120 is generally attached directly to a copper or aluminum mounting plate 122 by a thermal adhesive. Heat pipe 110 includes an evaporator portion 112 and a condenser portion 114. Evaporator portion 112 is typically embedded in mounting plate 122. Keyboard support plate 102 includes a clamp portion 118 for receiving the condenser portion 114 of heat pipe 110.

U.S. Pat. No. 5,568,360 also describes a heat removal system for a portable computer wherein the keyboard support plate serves as the system heat sink.

A common problem associated with these prior art heat removal systems is that the stacking height of the system components impose a design restraint on the thickness of the computer. These systems are also difficult to assemble. In addition, since the heat pipes of the prior art heat removal systems are attached to the keyboard support plate along discrete locations, the heat flux distribution across the surface of the keyboard tends to be non-uniform. This results in the keyboard being hotter in locations adjacent to the heat pipe and cooler at points located away from the heat pipe. This reduces the efficiency of the heat removal system. Moreover, the existence of hot spots along the surface of the keyboard can cause discomfort to the user.

What is needed then is an apparatus which solves the aforementioned problems associated with cooling internal electronic circuits located within portable consumer electronic and computer devices. Particularly, what is needed is a highly efficient cooling system that is conformable to the size restrictions imposed by small form factor and thin profile electronic devices, such as, for example, notebook computers.

SUMMARY OF THE INVENTION

An apparatus for removing heat from a heat generating component located within a computer system enclosure is disclosed. In accordance with the present invention a computer keyboard is provided having an integral heat pipe. The heat pipe provides structural support to the keyboard and is thermally coupled to one or more heat generating components housed within the computer system enclosure.

BRIEF DESCRIPTION OF THE DRAWINGS

The present invention is illustrated by way of example and is not limited by the figures of the accompanying drawings, in which like references indicate similar elements, and in which:

FIG. 5 illustrates a side-view of a heat removal system in accordance with one embodiment of the present invention.

DETAILED DESCRIPTION

A keyboard having an integral heat pipe is described. In the following description, numerous specific details are set forth such as material types, dimensions, processing steps, etc., in order to provide a thorough understanding of the present invention. However, it will be obvious to one of skill in the art that the invention may be practiced without these specific details. In other instances, well known elements and processing techniques have not been shown in particular detail in order to avoid unnecessarily obscuring the present invention. In order to illustrate the need for cooling systems that are capable of being integrated within an enclosure having limited available space, this discussion will mainly be limited to those needs associated with removing heat from integrated circuits housed within portable computers, such as notebook and laptop computers. It will be recognized, however, that such focus is for descriptive purposes only and that the apparatus and methods of the present invention are applicable to other electronic devices.

Figure 1:
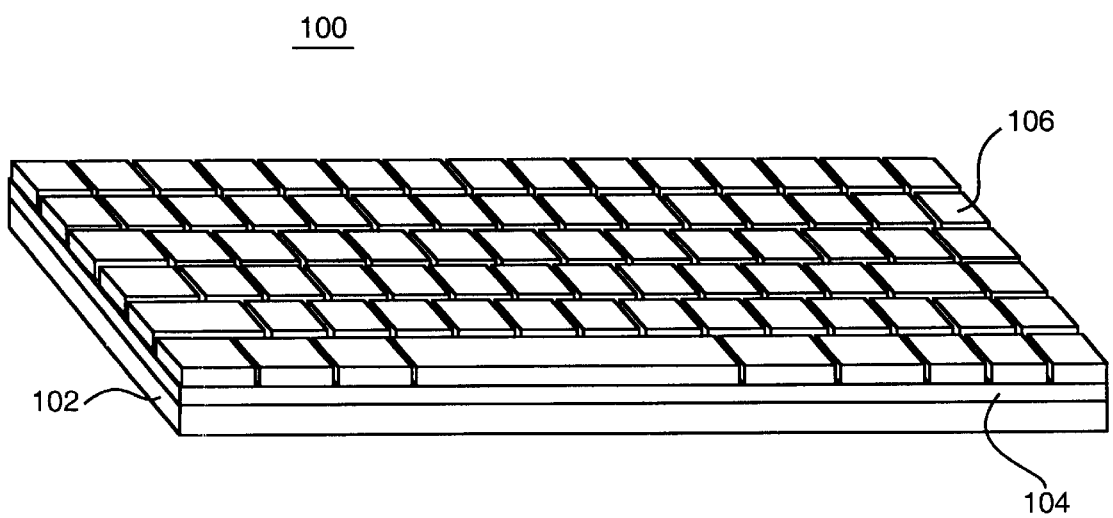
FIG. 1 illustrates a perspective view of a prior art computer keyboard.
Figure 2:
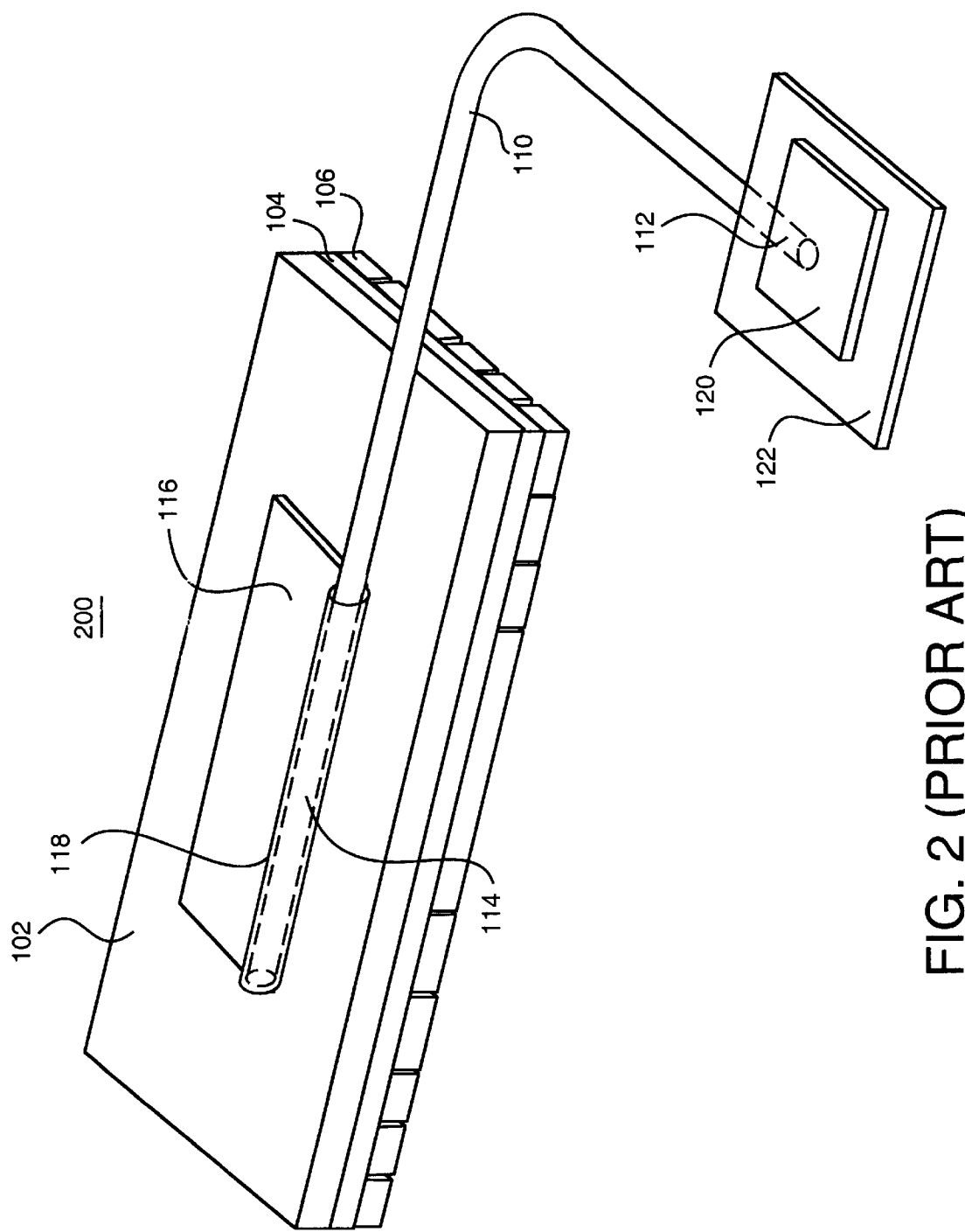
FIG. 2 illustrates a prior art heat removal system.
Figure 3A:
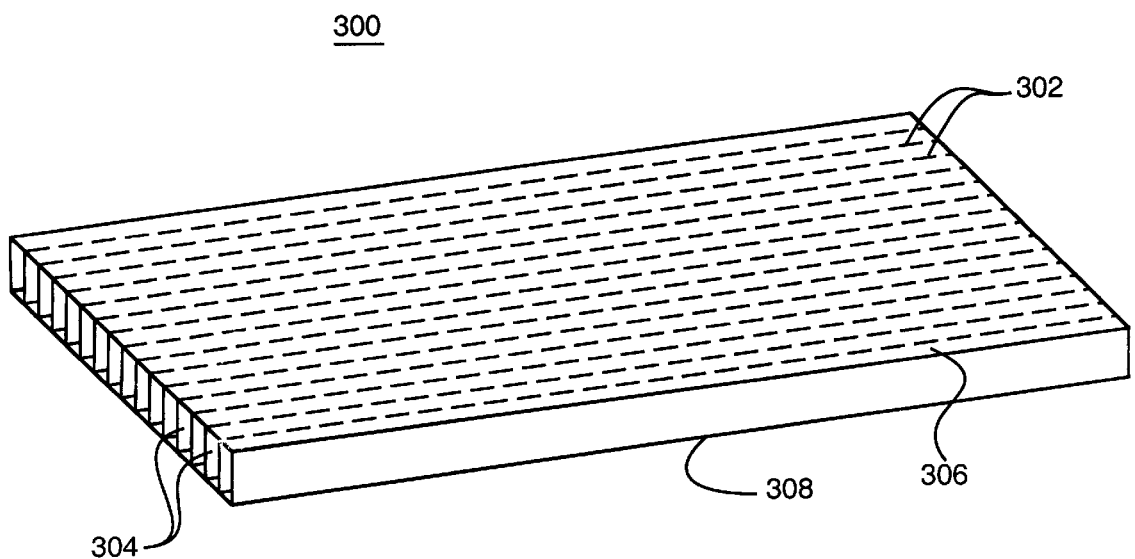
FIG. 3A is a perspective view of a keyboard heat pipe in one embodiment of the present invention.

In accordance with one embodiment of the present invention, a heat pipe forms the underside of a keyboard. The heat pipe replaces the prior art keyboard support plate 102 that is depicted in FIG. 1. FIG. 3A illustrates a perspective view of heat pipe 300 that is used in one embodiment of the present invention. The heat pipe 300 is flat due to the top surface 306 and backside surface 308 being substantially planar. Heat pipe 300 comprises a plurality of heat pipes 302 that are arranged in a parallel configuration. Each of heat pipes 302 is divided by sidewalls 304 and is sealed to contain a two-phase vaporizable liquid (not shown) which serves as the working fluid for the heat pipe. Each heat pipe draws vaporized fluid away from a heat input point (the evaporator region of the heat pipe) to a condenser region of the heat pipe. Each of heat pipes 302 contains a wick structure (not shown). The wick, by means of capillary flow, transports the condensed liquid from the condenser region back into the evaporator region of the heat pipe. The wick structure may include a wire mesh or grooves along the heat pipe walls, or any other porous member. Heat pipe 300 generally comprises a thermally conductive and rigid material, such as aluminum or copper. The rigidity of the heat pipe helps minimize keyboard warpage resulting from user pressure against the keyboard keys.

Figure 3B:
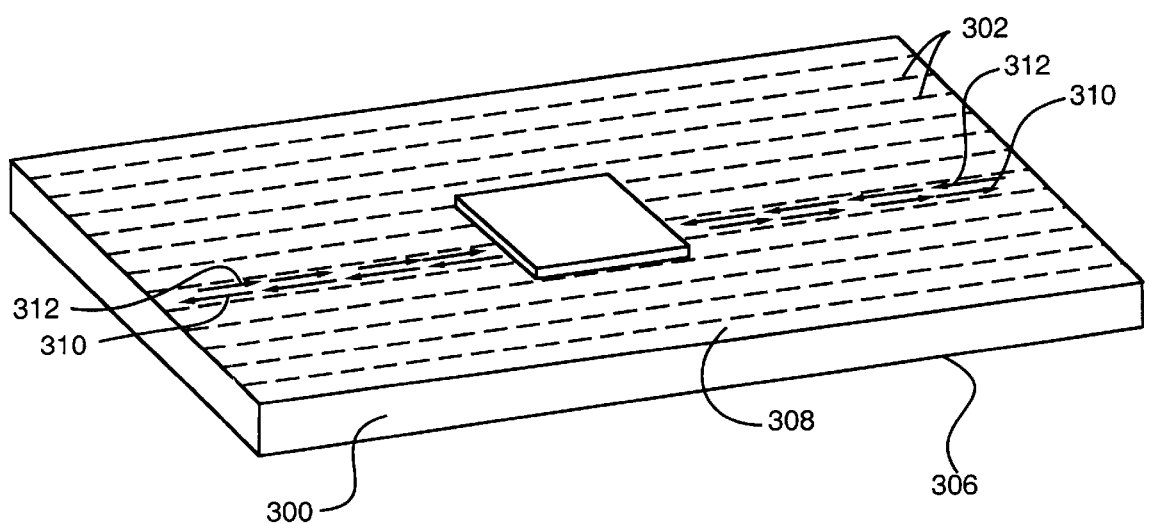
FIG. 3B shows the heat pipe of FIG. 3A having a heat generating device thermally coupled to the backside surface of the heat pipe.

Turning now to FIG. 3B, a heat generating device 330 is shown attached to the backside surface 308 of heat pipe 300. Arrows 310 and 312 illustrate the working fluid flow pattern in one of heat pipes 302. The portion of the heat pipe residing near device 330 constitutes the evaporator region of the heat pipe. The condenser region resides near the outer side edges of heat pipe 300. Heat vaporizes the working fluid within the evaporator region of the heat pipe and creates a differential pressure between the evaporator region and condenser region. The pressure differential causes the vaporized fluid to be pumped from the evaporator region to the condenser region of the heat pipe. The capillary action of the heat pipe wick causes the condensed working fluid to flow from the condenser region back to the evaporator region.

In one embodiment, heat pipe 300 is made of aluminum. In such an embodiment, a Freon or Freon substitute is used as the heat pipe working medium. Heat pipe 300 may be made of other high thermally conductive materials, such as copper. When heat pipe 300 is made of copper a purified water is generally chosen as the heat pipe working fluid since it is chemically compatible with copper and possesses a high latent heat. The surface area of heat pipe 300 is typically the same as the key pad surface area. In this manner, the key pad surface temperatures will remain substantially isothermal. Among other advantages, this eliminates the existence of hot spots along the surface of the keyboard making it more comfortable for the user. It is important to note, however, that the keyboard heat pipe of the present invention is not limited to any specific shape or size. In other embodiments, the surface area of the keyboard heat pipe may be substantially smaller than the key pad surface area and may comprise a variety of other shapes such as circular, polygon, etc.

The keyboard heat pipe of the present invention thus provides the keyboard with an enhanced ability to spread the heat generated by a heat generating device, such as an integrated circuit device, along the entire surface of the keyboard resulting in a more efficient heat removal system. The heat pipe's superior heat transfer capability also results in a substantially uniform heat distribution along the surface of the keyboard.

Figure 3C:
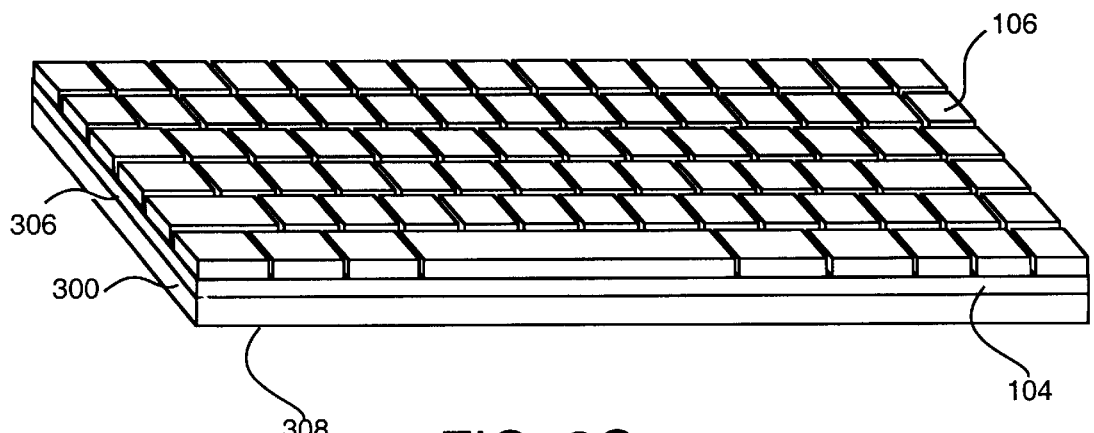
FIG. 3C is a perspective view of the keyboard heat pipe shown in FIG. 3B with a heat generating device attached to a surface of the heat pipe.

With reference to FIG. 3C, a printed circuit board 320 and a corresponding keypad 330 are shown attached to the top surface 306 of heat pipe 300.

Figure 4:
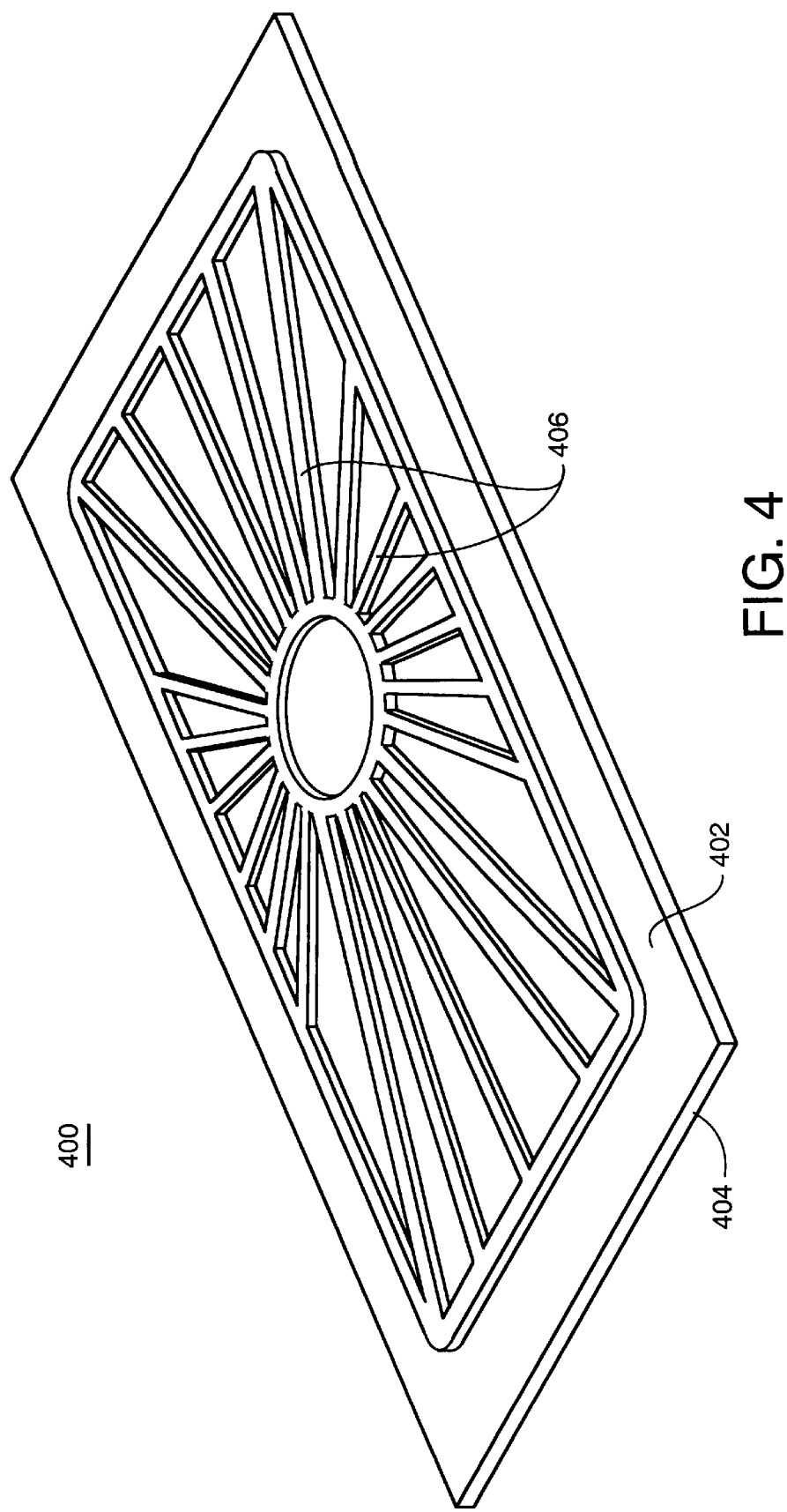
FIG. 4 is a perspective view of a keyboard heat pipe in another embodiment of the present invention.

The internal structure of the keyboard heat pipe of the present invention may vary considerably from one design to another. Thus, it is to be understood that the present invention is not limited to any one heat pipe configuration. As an example, FIG. 4 illustrates a keyboard heat pipe 400 in accordance with another embodiment of the present invention. Heat pipe 400 comprises two thin metal plates, 402 and 404, that are joined by a roll pressing process. Heat pipe 400 is made by first stamping, milling, or otherwise forming one or more heat pipe channels 406 within one, or both, of plates 402 and 404. In the embodiment illustrated in FIG. 4, the heat pipe channels 406 extend axially outward from an axial center location. The heat pipe wicking structure may comprise grooves within the heat pipe channels that are formed during the stamping or milling process. Alternatively, a metal mesh or other porous member may be attached to the channel walls. Once plates 402 and 404 have been joined and sealed, channels 406 are evacuated and then charged with a working fluid.

As noted earlier, modern microprocessors employ millions of transistors in internal circuitry and operate at ever increasing speeds. As a result, the amount of heat generated by modern microprocessor components has increased significantly. Particular problems arise when these components, and other high heat generating components, are placed within constrained compartments, such as portable computer enclosures. The keyboard of the present invention provides a highly efficient, passive heat removal system that is adaptable to the small confines of a portable computer enclosure.

With reference to FIG. 5, an apparatus for transferring heat from an integrated circuit device 502 to the backside 560 of a keyboard 550 according to the present invention is shown. Integrated circuit device 502 is attached to a C4 package 506 that is housed within a processor module 520. The processor module includes one or more integrated circuit packages that are attached to a printed circuit board 510. A processor module lid 512 that serves to protect the integrated circuit package is attached to printed circuit board 510 by a plurality of fasteners 514. A thermal grease (not shown) is generally disposed between the backside of integrated circuit device 502 and module processor lid 512. Processor module lid 512 is attached to keyboard 550 which has an integral heat pipe 552. Keyboard 550 comprises a keypad 106 and printed circuit board 104 that are attached to heat pipe 552. A thermal grease or other compliant thermally conductive material may be disposed between the bottom surface of heat pipe 552 and the top surface of lid 512 to enhance the heat transfer between the two components. Heat is transferred away from the backside surface of integrated circuit device 502 and into heat pipe 552 across lid 512. Heat pipe 552 distributes the heat in a substantially uniform fashion along the entire surface area of keyboard 550. The heat is ultimately released from the keypad surface to the ambient environment by natural convection and radiation.

It is important to note that the heat removal system shown in FIG. 5 is illustrative of only one of many conceivable heat transfer systems that may be used in conjunction with the keyboard heat pipe of the present invention. For example, integrated circuit device 502 may be housed within a tape carrier package that is directly attached to the backside of heat pipe 552. Alternatively, device 502 may be located remotely from keyboard 550 and thermally coupled to keyboard heat pipe 552 via a low resistant thermal path, such as a heat pipe.

Thus, a keyboard having an integral heat pipe has been described that results in a cost efficient, low weight, extremely compact and thermally efficient thermal management system. Although the present invention has been described particularly with reference to FIGS. 3A through 5, it is contemplated that many changes and modifications may be made by one of ordinary skill in the art without departing from the spirit and scope of the present invention. For example, the size and shape of the keyboard heat pipe may vary considerably from one design to another. Materials other than those described that possess the proper heat transfer and weight characteristics may also be used.

What is claimed is:

1. A heat removal system comprising:
    a keyboard including a printed circuit board having a top surface and a bottom surface, a plurality of keys mechanically coupled to said top surface;
    a heat pipe including a plurality of channels defined between a top wall and a bottom wall, said top wall directly mounted to said bottom surface of said printed circuit board and covering a majority of said bottom surface of said printed circuit board; and
    a heat generating device thermally coupled to said bottom wall of said heat pipe.

2. The heat removal system of claim 1 wherein said heat generating device is directly mounted to said bottom wall of said heat pipe.

3. The heat removal system of claim 1 wherein said heat pipe covers said bottom surface of said printed circuit board entirely.

4. The heat removal system of claim 1 wherein said heat pipe has heat pipe channels extending axially from an axial center location.

5. The heat removal system of claim 1 wherein said heat generating device comprises an integrated circuit.

6. A computer keyboard having a heat pipe structurally supporting said keyboard, said heat pipe having approximately the same length and width as said keyboard, said heat pipe being the only metallic structure that spreads heat from a heat generating device along the length and width of said keyboard.

7. The computer keyboard of claim 6 wherein a heat generating device is thermally coupled to said heat pipe.

8. The computer keyboard of claim 6 wherein said heat generating device comprises an integrated circuit.

9. The computer keyboard of claim 6 wherein said heat pipe comprises a plurality of flat heat pipes that are arranged parallel to one another.

10. The computer keyboard of claim 6 wherein said heat pipe has heat pipe channels extending axially from an axial center location.

11. The computer keyboard of claim 6 wherein said heat pipe has a substantially planar surface, said planar surface having a heat generating device thermally coupled thereto.

12. An apparatus comprising:
    a computer having a heat generating device; and
    a keyboard having a heat pipe that provides structural support to said keyboard, said heat pipe having approximately the same length and width as said keyboard, said heat generating device being thermally coupled to said heat pipe, said heat pipe being the only metallic structure that spreads heat from said heat generating device along the length and width of said keyboard.

13. The apparatus of claim 12 wherein said heat pipe comprises a plurality of flat heat pipes that are arranged parallel to one another.

14. The apparatus of claim 12 wherein said heat pipe has heat pipe channels extending axially from an axial center location.

15. The apparatus of claim 12 wherein said heat generating device comprises an integrated circuit.

16. A computer keyboard comprising:
    a heat pipe having a first substantially planar surface and a second planar surface, a heat generating device being thermally coupled to said second planar surface, the heat pipe being the only metallic structure that spreads heat from said heat generating device along said computer keyboard;
    a printed circuit board attached to said first planar surface; and
    a plurality of keys mechanically coupled to said printed circuit board.

17. The computer keyboard of claim 16 wherein said heat generating device comprises an integrated circuit.

18. The computer keyboard of claim 16 wherein said heat pipe comprises a plurality of flat heat pipes that are arranged parallel to one another.

19. The computer keyboard of claim 16 wherein said heat pipe has heat pipe channels extending axially from an axial center location.

20. An apparatus comprising:
    a keyboard having a plurality of keys mechanically coupled to a printed circuit board, said keyboard further comprising a heat pipe, said heat pipe having a first surface and a second surface, said heat pipe having approximately the same length and width as said keyboard, said printed circuit board being supported by said first surface; and
    an electronic device thermally coupled to said second surface, said heat pipe being the only metallic structure that spreads heat from said electronic device along the length and width of said keyboard.

21. The apparatus of claim 20 wherein said heat pipe comprises a plurality of flat heat pipes that are arranged parallel to one another.

22. The apparatus of claim 20 wherein said heat pipe has heat pipe channels extending axially from an axial center location.

23. The apparatus of claim 20 wherein said electronic device comprises an integrated circuit.

24. A computer keyboard comprising:

a printed circuit board having a top surface and a bottom surface;

a plurality of keys on said top surface; and a heat pipe attached to said bottom surface of said printed circuit board, said heat pipe having a planar surface covering a majority of said bottom surface of said printed circuit board, said heat pipe being the only metallic structure that spreads heat from a heat generating device along said bottom surface of said printed circuit board.

25. The computer keyboard of claim 24 wherein only said heat pipe instead of a keyboard plate is attached to said bottom surface of said printed circuit board to support said computer keyboard.

26. The computer keyboard of claim 24 wherein said heat pipe comprises a plurality of flat heat pipes that are arranged parallel to one another.

27. The computer keyboard of claim 24 wherein said heat pipe has heat pipe channels extending axially from an axial center location.

28. The computer keyboard of claim 24 wherein said heat generating device comprises an integrated circuit.

29. The computer keyboard of claim 28 wherein said integrated circuit is thermally coupled to said heat pipe.

* * * * *

UNITED STATES PATENT AND TRADEMARK OFFICE
CERTIFICATE OF CORRECTION

PATENT NO. : 6,215,657 B1
DATED : April 10, 2001
INVENTOR(S) : Bhatia

It is certified that error appears in the above-identified patent and that said Letters Patent is hereby corrected as shown below:

<u>Column 4,</u>
Line 32, delete "modem" insert -- modern --.

Signed and Sealed this

Twenty-eighth Day of May, 2002

Attest:

JAMES E. ROGAN
*Attesting Officer*     *Director of the United States Patent and Trademark Office*